Nov. 25, 1969  R. A. HELRIGEL  3,479,905

FLYWHEEL ASSEMBLY

Filed Oct. 19, 1967

INVENTOR.
Robert A. Helrigel
BY
Meyer, Tilberry & Body
ATTORNEYS

United States Patent Office 3,479,905
Patented Nov. 25, 1969

3,479,905
FLYWHEEL ASSEMBLY
Robert Arthur Helrigel, Hastings, Mich., assignor to
E. W. Bliss Company, Canton, Ohio, a corporation of
Delaware
Filed Oct. 19, 1967, Ser. No. 676,566
Int. Cl. G05g 5/08
U.S. Cl. 74—572                                6 Claims

ABSTRACT OF THE DISCLOSURE

There is provided an improvement in a flywheel assembly of the type adapted for machines and the like, and having a first inertia mass coupled to a machine shaft through a clutch assembly. Secondary inertia masses are stored in non-rotatable position relative to the shaft, such masses being separately mountable on the first inertia mass for rotation therewith. Latch means mounted on the machine and engageable with the secondary inertia masses maintain such secondary masses in stored position when not in use. Upon release of the latch means, one or more of the secondary inertia masses may be moved into secure engagement with the first inertia mass for rotation therewith to provide additional flywheel energy.

---

Figure 1:
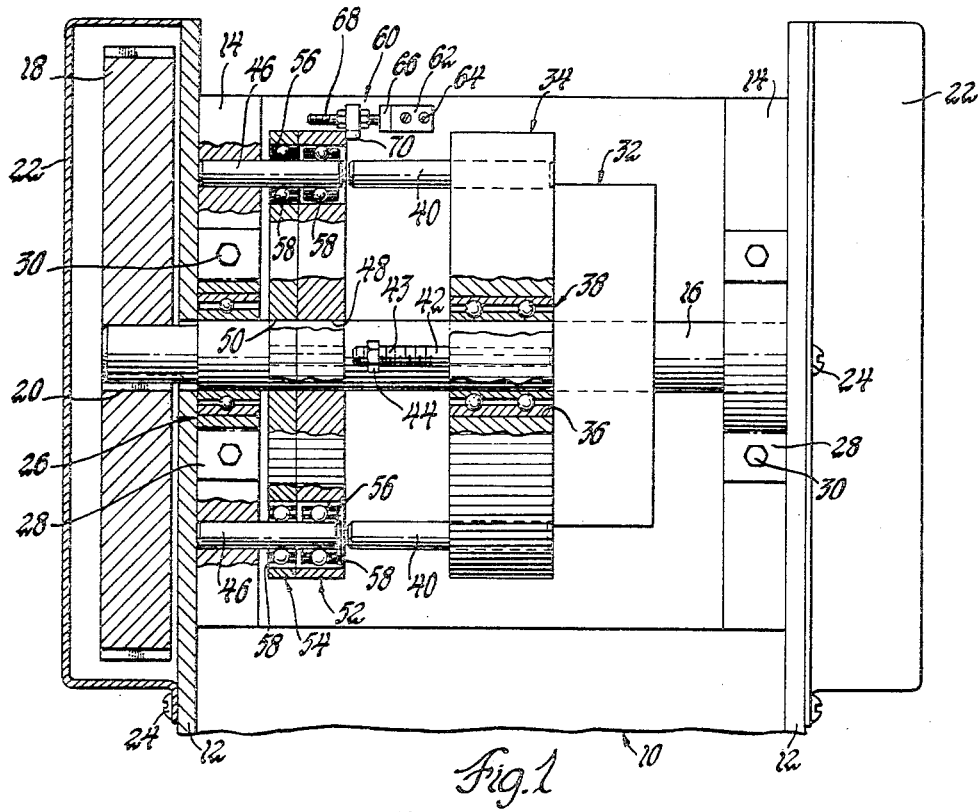

The present invention pertains to the art of flywheels and more particularly to a flywheel assembly having selectively variable kinetic energy.

The present invention is particularly applicable to large machine presses and the like, wherein a flywheel provides energy required to carry out the machine operations, and it will be discussed with particular reference thereto; however, it is to be appreciated that the invention has much broader applications and may be used in various other machines utilizing a rotating shaft in the power train.

In the design, manufacture and useage of large machine presses used in the manufacture of metal parts, such as stampings and the like, a flywheel is generally provided in the power train to apply a desired amount of operating energy to the drive of the machine and thus carrying out the functions of the machine. The flywheel is designed for rotation at a particular speed in order to provide the optimum amount of energy and to give the desired tonnage capacity to the press at the speed of operation. Difficulties are encountered when the machine is of a variable speed drive type, and it is the usual practice to design the flywheel to give full tonnage capacity at the middle range of the drive speed. Since the kinetic energy in the flywheel is proportional to the square of the velocity of the flywheel, and is proportional to the weight of the flywheel, the energy produced by the flywheel is decreased at low speed operation of the machine and does not have the ability to provide the full tonnage capacity. In the past, complicated and cumbersome means have been provided to vary the inertia of the flywheel device, utilizing many complex mechanisms that are extremely expensive to manufacture and produce and which have a great number of moving parts subject to wear and the need for constant replacement and repair. Accordingly, there has been an ever-present demand for a means of providing a variable weight flywheel assembly that would provide the necessary energy at all speeds of operation, a substantial reduction in the materials and parts required for the manufacture and production of the assembly and its use in a machine and a reduction in the cost of operating the machine as a result thereof.

In accordance with the present invention, there is provided a flywheel assembly for varying the flywheel energy in a machine with a relatively few number of easily assembled parts, readily accessible and inexpensive to manufacture, produce and operate.

In accordance with another aspect of the present invention, there is provided a flywheel assembly comprising a plurality of inertia masses that are combinable in an efficient and simple manner to vary the flywheel energy produced at a particular rotating speed.

In accordance with still another aspect of the present invention, there is provided a flywheel assembly comprising a first inertia mass mountable on a drive shaft and a plurality of secondary inertia masses easily and quickly securable to the first inertia mass for rotation therewith as desired.

In accordance with still a further aspect of the present invention, there is provided a flywheel assembly comprising a first inertia mass rotatable with a shaft in the drive system of a machine and adjacent to which are located a plurality of secondary inertia masses, one or more of such secondary masses being easily secured to the first inertia mass for rotation therewith, and latch means mounted on the machine to maintain the secondary inertia masses in a non-interfering position with the first inertia mass when their use is not desired.

The primary object of the present invention is the provision of a flywheel assembly comprising a plurality of inertia masses which may be joined together to increase the kinetic energy of the flywheel assembly as the need therefor arises.

Another object of the present invention is the provision of a flywheel assembly comprising a first inertia mass rotatably mounted on a shaft and having means thereon for receiving secondary inertia masses as the requirement for increased kinetic energy becomes apparent. Latch means, securement means and bearing means in the flywheel assembly are provided to create an efficient and inexpensive apparatus for varying the kinetic energy of the flywheel assembly to apply the proper energy to the machine and assure proper functioning thereof at varying speeds of operation.

Figure 2:
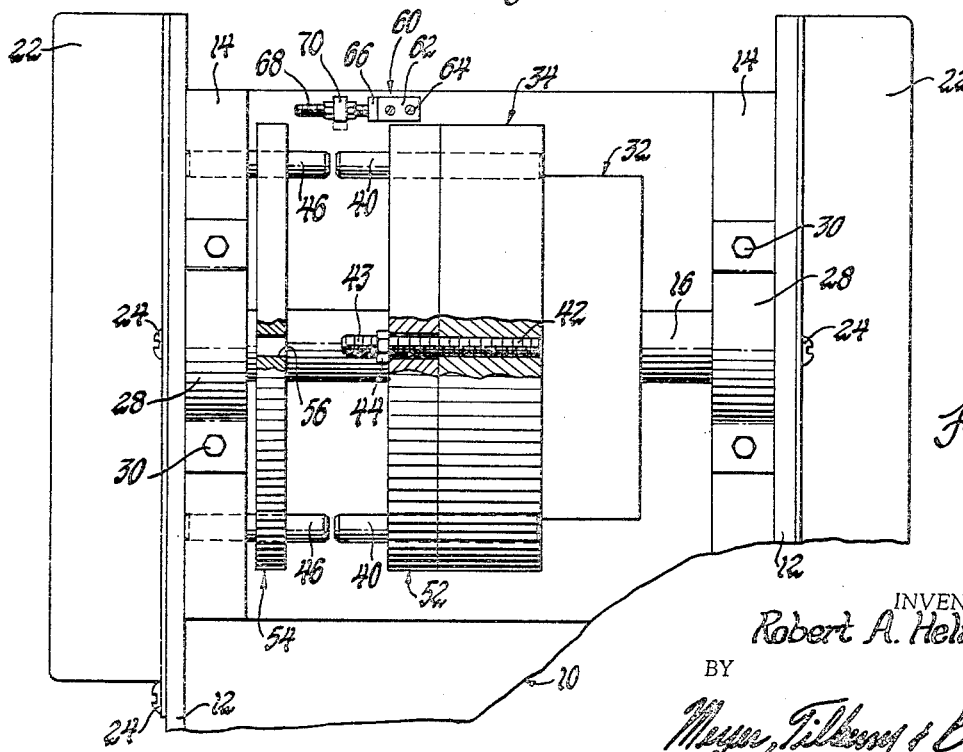

These and other objects and advantages will become apparent from the following description used to illustrate the preferred embodiment of the present invention, as read in connection with the accompanying drawings wherein:

FIGURE 1 is a partial elevational view of a machine constructed in accordance with the present invention and with parts broken away and in section to illustrate the positions of the various parts in one condition of operation; and, FIGURE 2 is a view similar to FIGURE 1 illustrating the preferred embodiment of the present invention and showing the parts thereof in a second condition of operation.

Referring now to the drawings wherein the showings are for the purpose of illustrating a preferred embodiment of the invention only and not for the purpose of limiting same, FIGURE 1 shows a portion of a press machine, illustrated generally by the numeral 10, which is of a type well known in the prior art for the stamping, forming or carrying out of other operations on metal parts. Machine 10 includes upright frame members 12, to which are secured spaced bearing blocks 14, the purpose for which will become hereinafter more apparent.

Disposed between the upright members 12 is a shaft 16 which may carry suitable driving mechanisms, such as gear 18, at either or both ends thereof. Gear 18 may be secured for rotation with shaft 16 in any suitable manner, as by a key or the like 20. In order to protect the gear 18 and remainder of the drive assembly, not shown, a sheet metal housing 22 may be provided, the housing 22 being secured to the frame upright 12 in any suitable manner, as by screws 24.

Shaft 16 is supported in the bearing blocks 14 by suitable roller or ball bearing assemblies, indicated generally by the numeral 26, in the usual manner, the bearing assemblies 26 being held in place by saddle members 28 secured to the bearing blocks 14 by bolts 30. It will be apparent that the shaft 16 may be driven in any suitable manner to transfer the drive to one or the other of the gear assemblies 18 and thence to the remainder of the machine for carrying out the functions thereof.

Suitably disposed on the shaft 16 is a clutch assembly, illustrated generally by the numeral 32, which may be of conventional construction and for purposes to become hereinafter more apparent.

Also received on the shaft 16, and properly coupled to the clutch assembly 32 is a flywheel inertia mass, indicated generally by the numeral 34, which takes the form of a suitably weighted annular wheel having a central bore 36 for receiving a bearing assembly, indicated generally by the numeral 38, journaling the mass 34 on the shaft 16. When the flywheel 34 is properly coupled through the clutch mechanism 32, the wheel 34 will rotate with shaft 16 in the normal manner. When the inertia mass 34 is disconnected from the clutch assembly 32, the wheel 34 will not rotate with the shaft 16, the bearing assembly 38 assuring relatively frictionless rotation therebetween.

Extending axially outwardly from one face of the inertia mass 34 are a plurality of pins 40 annularly spaced around the inertia mass 34. In addition, at least two pins 42 in the pin annulus are threaded, as illustrated at 43 in the drawing, to receive a nut 44 or other suitable fastening device.

Extending axially outwardly from one bearing block 14, such as that shown at the left in FIGURES 1 and 2 of the drawing, are two or more pins 46, the pins extending toward and being aligned with the pins 40 extending from the inertia mass 34. Pins 46 are thus fixed with respect to the machine frame 10 and are of such length so as to terminate closely adjacent the pins 40 but so as not to interfere therewith during the normal rotation of the inertia mass 34.

Carried at a position axially spaced from the first inertia mass 34 are secondary inertia masses, indicated generally by the numerals 52 and 54 respectively. Masses 52 and 54 are similar in structure and may differ in axial width, thus differing in weight. Each mass is provided with an annular series of apertures 56, having suitable bearing assemblies 58 disposed therein, the masses being receivable over the pins 46 extending outwardly from the left hand bearing block 14. Enlarged openings 48 and 50 are formed through masses 52 and 54, respectively. These openings permit the shaft 16 to rotate relative to the inertia masses 52 and 54 when mounted on the pins 46, so that the inertia masses 52 and 54 have no effect on the operation of the machine. Thus, the inertia masses 52 and 54 are stored for use as will be hereinafter described.

In order to retain the inertia masses 52 and 54 in the storage position, a latch assembly, indicated generally by the numeral 60, is provided. Latch assembly 60 includes a bracket 62, secured to the machine by screws 64, or the like, and having an outwardly extending flange 66 in which is secured a threaded stud 68. Mounted on stud 68 is a latch member 70 which is rotatable about the axis of the stud 68. When the latch member 70 is in the position illustrated in FIGURE 1, it serves as a stop to prevent the inertia members 52 and 54 from moving toward the right, as viewed in FIGURE 1 and, thus interfering with the rotation of the first inertia mass 34 and the pins 40 and 42 extending outwardly therefrom.

At such time as the speed of the machine should be decreased, and it should become necessary to increase the kinetic energy of the flywheel assembly to provide full tonnage capacity of the machine at the lower speed, one or both of the secondary inertia masses 52 and 54 may be moved from the storage position on the pins 46 to a second position on the pins 40 and 42 extending from the first inertia mass 34. This may easily be accomplished by rotating the latch member 70 out of engagement with the inertia mass 52, aligning the pins 46 and 40 and sliding the secondary inertia mass 52 onto the pins 40 and 42. Nuts 44 may then be threaded onto the pins 42 to secure the secondary mass 52 in position for rotation with the first inertia mass 34. Return of the latching member 70 to the position shown in FIGURE 1 will prevent the inertia mass 54 from traveling too far to the right, as viewed in FIGURE 1, where it would interfere with the normal rotation of the flywheel assembly. Should still further weight be desired for the speed of the machine, the latch 70 may again be rotated to free the secondary inertia mass 54 for mounting with the first inertia mass 34 and the inertia mass 52. Nuts 44 again provide the securing means for the secondary inertia masses 52 and 54.

When the flywheel assembly includes the primary inertia mass 34 and one or more of the inertia masses 52 and 54, the weight of rotating flywheel assembly will be increased and will provide the necessary kinetic energy even though the speed has been reduced. When the machine is returned to normal speed, the nuts 44 may be removed and the secondary inertia masses 52 and 54 moved back to their storage position, as shown in FIGURE 1.

It will be readily apparent that more than two secondary inertia masses may be provided and such inertia masses may be of varying thicknesses to provide an infinite number of combinations for attachment to the primary inertia mass 34, as the requirements of the machine may dictate.

The present invention has been described in connection with certain structural embodiments; however, it is to be appreciated that various changes may be made in the structural embodiments without departing from the intended spirit and scope of the invention as defined by the appended claims.

Having thus described my invention, I claim:

1. In a machine having a frame and a horizontally extending, rotatable shaft, an improved flywheel assembly comprising: a first inertia mass carried by said shaft and rotatable therewith, a second inertia mass slidably mounted at a first position axially spaced from said first inertia mass; said second inertia mass being slidable to a second position in engagement with said first mass and rotatable therewith and with said shaft; and, means for securing said second inertia mass to said first inertia mass for rotation therewith, said means for securing said second inertia mass to said first inertia mass including a plurality of pins extending axially from said first inertia mass toward said second inertia mass, said second inertia mass having apertures therein receiving said pins when said second inertia mass is moved from said first position to said second position, fastening means on at least one of said pins for clamping said second inertia mass to said first inertia mass when said second inertia mass is in said second position, and latch means mounted on said machine and engageable with said second inertia mass when said second inertia mass is in said first position for preventing interference of said second inertia mass with said first inertia mass, said latch means being operable to disengage from said second inertia mass to permit movement of said second inertia mass from said first position to said second position.

2. In a machine having a frame and a horizontally extending, rotatable shaft, an improved flywheel assembly comprising: a first inertia mass carried by said shaft and rotatable therewith, a second inertia mass slidably mounted at a first position axially spaced from said first inertia mass; said second inertia mass being slidable to a second position in engagement with said first mass and rotatable therewith and with said shaft; and, means for securing said second inertia mass to said first inertia mass for rotation therewith, said means for securing said second inertia mass to said first inertia mass including a plurality of pins extending axially from said first inertia mass toward said second inertia mass, said second inertia mass having apertures therein receiving said pins when said second inertia mass is moved from said first position to said second position, fastening means on at least one of said pins for clamping said second inertia mass to said first inertia mass when said second inertia mass is in said second position and, said means for securing said second inertia mass to said first inertia mass including a plurality of pins extending axially from said first inertia mass toward said second inertia mass, said second inertia mass having apertures therein receiving said pins when said second inertia mass is moved from said first position to said second position, and fastening means on at least one of said pins for clamping said second inertia mass to said first inertia mass when said second inertia mass is in said second position.

3. The improvement as set forth in claim 2 and further including bearing means in said apertures in said second inertia mass for permitting easy movement of said second inertia mass from said pins in said machine to said pins extending from said first inertia mass when moving said second inertia mass from said first position to said second position.

4. The improvement as set forth in claim 3 and further including a third inertia mass having apertures therein and slidably mounted and having a first position mounted on said pins in said machine and adjacent said second inertia mass when said second inertia mass is in said first position, said third inertia mass being movable to a second position on said pins extending from said first inertia mass after said second inertia mass is moved from the first position thereof to the second position thereof for rotation with said first and second inertia masses.

5. The improvement as set forth in claim 4 wherein said latch means is engageable with said third inertia mass when said second inertia mass is in said second position thereof for preventing interference of said third inertia mass with said first and second inertia masses when said third inertia mass is in said first position.

6. The flywheel assembly set forth in claim 5 and further including bearing means mounted in said apertures in said third inertia mass for permitting easy movement of said third inertia mass from said pins in said machine to said pins extending from said first inertia mass.

References Cited

UNITED STATES PATENTS

| | | | |
|---|---|---|---|
| 931,006 | 8/1909 | Bascom | 74—572 XR |
| 1,578,247 | 3/1926 | Allen | 74—572 XR |
| 1,703,991 | 3/1929 | Day | 74—572 |
| 2,061,261 | 11/1936 | Walter | 74—572 |
| 3,412,603 | 11/1968 | Obarski | 74—572 XR |

FRED C. MATTERN, JR., Primary Examiner

F. D. SHOEMAKER, Assistant Examiner